United States Patent [19]

Holmgren

[11] 4,394,029
[45] Jul. 19, 1983

[54] FOOT OPERATED VEHICLE

[76] Inventor: Frank E. Holmgren, P.O. Box No. 8, Big Lake, Minn. 55309

[21] Appl. No.: 250,762

[22] Filed: Apr. 3, 1981

[51] Int. Cl.³ .................. A63C 17/04; B62K 21/10
[52] U.S. Cl. .................. 280/11.23; 280/271; 280/87.04 R
[58] Field of Search ............ 280/270, 271, 87.04 R, 280/11.21, 11.23, 7.13; 464/57; 74/555.1; 16/35 R, 35 D, 38–40; 403/116–117, 109–113

[56] References Cited

U.S. PATENT DOCUMENTS

| | | | |
|---|---|---|---|
| 606,525 | 6/1898 | Dunning | 464/57 |
| 628,433 | 7/1899 | Finch | 280/7.13 |
| 730,622 | 6/1903 | Edmunds | 280/271 |
| 1,345,038 | 6/1920 | Uppling | 280/11.23 |
| 1,534,601 | 4/1925 | Matveyeff | 280/11.23 |
| 1,614,822 | 1/1927 | Bukolt | 280/87.04 R |
| 1,653,558 | 12/1927 | Fisher | 280/11.23 |
| 1,687,739 | 10/1928 | Slusher | 280/11.2 |
| 1,701,410 | 2/1929 | Hornquist | 280/87.04 |
| 1,714,000 | 5/1929 | Davis | 188/2 R |
| 2,198,667 | 4/1940 | Hagenes | 280/87.04 |
| 2,439,556 | 4/1948 | Bancroft | 280/87.04 |
| 3,288,251 | 11/1966 | Sakwa | 188/29 |
| 3,484,116 | 12/1969 | Allen | 280/11.21 |
| 3,684,305 | 8/1972 | McDonald et al. | 280/11.19 |
| 3,876,217 | 4/1975 | Copier | 280/11.23 |
| 3,891,225 | 6/1975 | Sessa | 280/11.19 |
| 4,033,596 | 7/1977 | Andorsen et al. | 280/11.2 |
| 4,102,541 | 7/1978 | Altorfer | 280/11.1 BT |
| 4,103,917 | 8/1978 | Wildof | 280/11.28 |
| 4,166,629 | 9/1979 | List | 280/11.28 |
| 4,169,687 | 10/1979 | Schull | 403/109 |
| 4,179,134 | 12/1979 | Atkinson | 280/87.04 A |
| 4,202,559 | 5/1980 | Piazza | 280/11.27 |

Primary Examiner—David M. Mitchell
Assistant Examiner—Timothy Roesch
Attorney, Agent, or Firm—Burd, Bartz & Gutenkauf

[57] ABSTRACT

A foot operated vehicle having a frame with a flat foot support platform supported by front and rear wheels for the support of one foot of the operator while the vehicle is propelled by the other foot of the operator and wherein turning is accomplished by a leaning motion of the operator in the intended direction of the turn. A steerable front wheel assembly of the vehicle includes a front axle, a front wheel mounted on the front axle, a steering shaft connected to the front axle and assembled to the frame for pivotal rotation of the front wheel about a generally upright axis. Bias means are connected between the steering shaft and the frame operable to bias the front wheel in a straight ahead or centered position with respect to the frame whereby upon execution of a turn, the front wheel pivots in the direction of the turn against the influence of the bias means, and is returned to the straight ahead position by the bias means upon completion of the turn.

14 Claims, 7 Drawing Figures

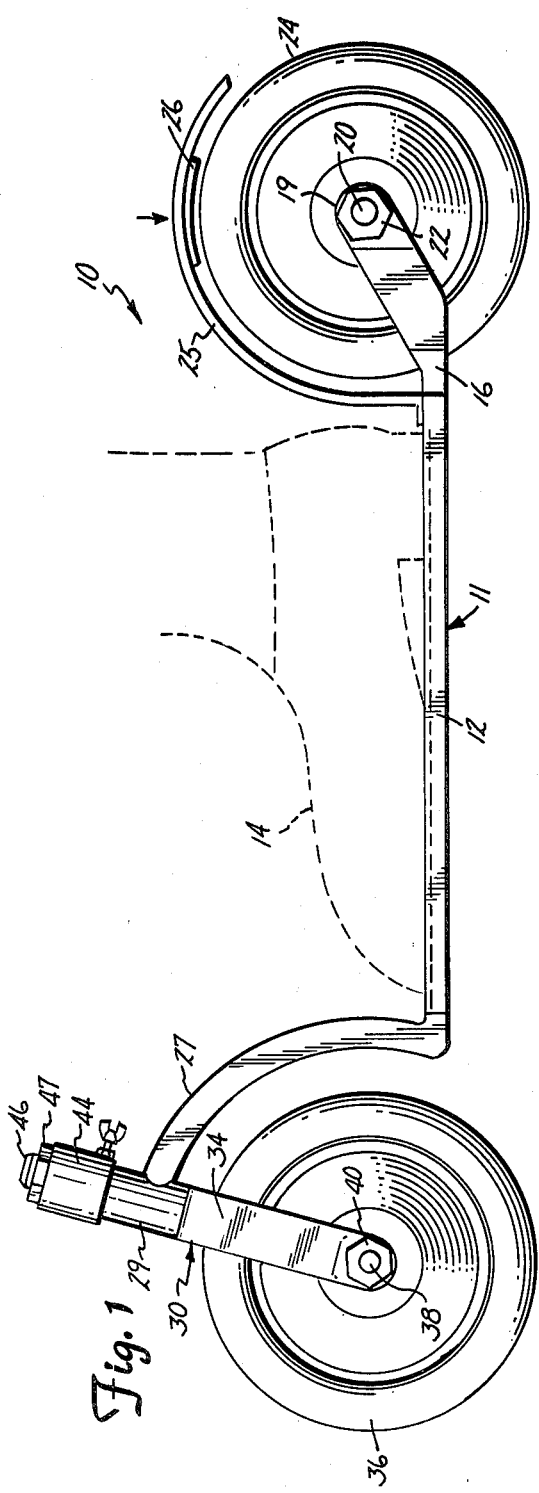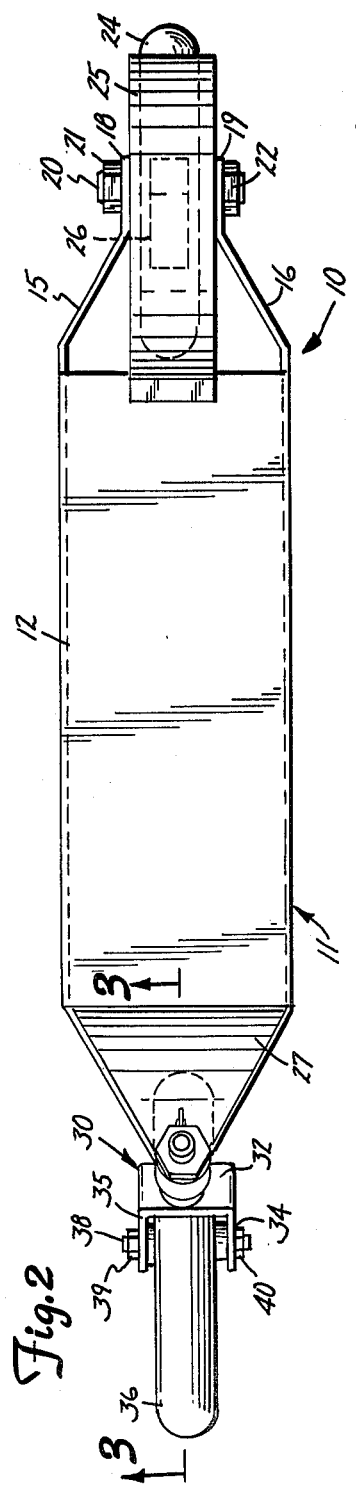

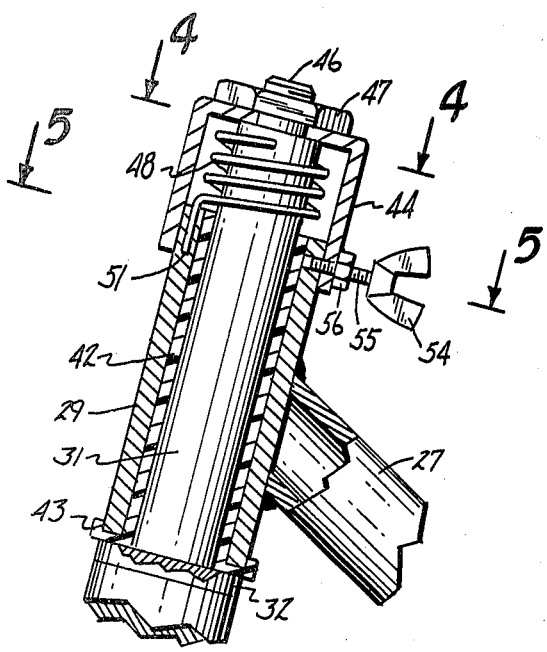
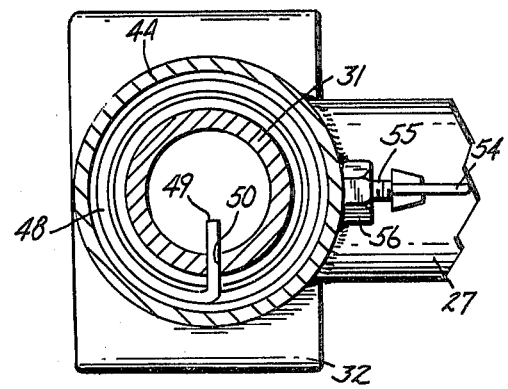
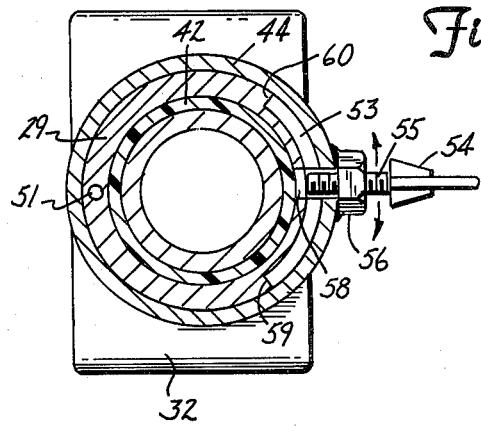
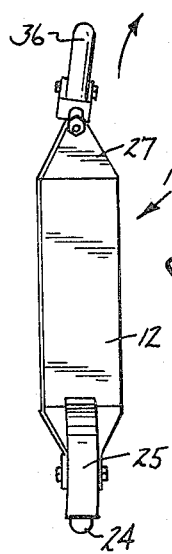
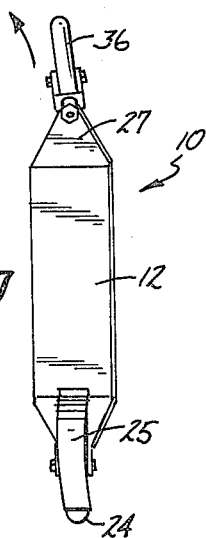

FOOT OPERATED VEHICLE

SUMMARY OF THE INVENTION

The invention pertains to a foot operated vehicle of the type wherein one foot is placed on a foot support platform while the other foot is used as a means of propulsion. Various such wheeled devices are popular in use for recreation particularly among younger persons. Turning of such devices by the operator can be hazardous and is accompolished by leaning in the intended direction of the turn. The turning maneuver is more easily accompolished if a wheel is provided that pivots according to the turn. Such a pivoting wheel can be prone to rotate more than is needed for the turn and, in addition, can pose difficulties in recovering after the turn and resuming a straight ahead orientation, also producing a hazard.

The foot operated vehicle of the present invention includes a frame having a flat foot support platform supported by front and rear wheels. The front wheel assembly permits pivoting of the front wheel about a generally upright axis during a turn. A front wheel is mounted on an axle which is in turn mounted between bifurcated legs of a fork member. An upright shaft of the fork member is pivotally assembled in a collar fixed to the frame for pivotal movement about a generally upright axis. Bias means assembled between the shaft and the collar tends to center the wheel or bias it in a straight ahead orientation. Upon execution of a turn, the wheel pivots against the influence of the bias means, but upon recovery from the turn, the wheel is returned to the straight ahead orientation. Means are provided on the collar for limitation of the amount of permissible rotation of the front wheel in the execution of a turn.

IN THE DRAWINGS

FIG. 1 is a side elevational view of a foot operated vehicle according to the invention with a foot being supported thereon;

FIG. 2 is a top plan view of the foot operated vehicle of FIG. 1;

FIG. 3 is an enlarged sectional view of a portion of the foot operated vehicle of FIG. 2 taken along the line 3—3 thereof;

FIG. 4 is an enlarged sectional view of the portion of the foot operated vehicle of FIG. 3 taken along the line 4—4 thereof;

FIG. 5 is an enlarged sectional view of the portion of the foot operated vehicle of FIG. 3 taken along the line 5—5 thereof;

FIG. 6 is a top plan view of a foot operated vehicle of the invention in the execution of a right turn; and FIG. 7 is a top plan view of a foot operated vehicle of the invention in the execution of a left turn.

DESCRIPTION OF A PREFERRED EMBODIMENT

Referring to the drawings, there is shown in FIGS. 1 and 2 a foot operated vehicle 10 having a frame 11 including a longitudinal generally rectangular rigid foot support platform 12. Platform 12 supports a foot 14. A pair of arms 15, 16 extend rearwardly from the trailing edge of platform 12 in converging relationship, terminating in flat, parallel spaced apart end portions 18, 19. End portions 18, 19 of arms 15, 16 carry a transverse rear axle 20 secured by end mounting nuts 21, 22. Axle 20 rotatably carries a rear wheel 24. The arms 15, 16 also extend upwardly whereby the axis of rotation of wheel 24 on axle 20 is elevated above the upper plane of platform 12 by approximately one half the radius of wheel 24. A resilient arcuate rear fender 25 extends from the rear edge of platform 12 up and over rear wheel 24. A brake pad 26 is mounted on the under side of fender 25 over the wheel 24. Foot pressure applied to the top of the fender 25 is effective to deflect the fender 25 and move the brake pad 26 into contact with the rear wheel 24 to retard or stop rotation of rear wheel 24 and vehicle 10.

An arcuate neck 27 extends upwardly and forwardly from the leading edge of platform 12. A cylindrical tubular collar 29 is fixed to the outward end of neck 27 as by welding or the like. Collar 29 has an axis that is generally upright and slightly rearwardly inclined. A front wheel fork 30 has a steering shaft 31 rotatably assembled in collar 29. The lower end of shaft 31 extended outward of collar 29 is fixed to a transverse cross bar 32. Bifurcated parallel legs 34, 35 extend downwardly from the outer ends of cross bar 32 in straddling relationship to a front wheel 36. The lower ends of legs 34, 35 carry a transverse front axle 38 which rotatably mounts the front wheel 36. Mounting nuts 39, 40 are assembled on the opposite ends of axle 38 to keep it in position. Front axle 39 is located at the same vertical position as rear axle 20 when vehicle 10 is on a level surface. Platform 12 is in a horizontal plane located below the rear axle 20 and front axle 38.

A tubular sleeve bearing 42 surrounds the portion of steering shaft 31 located in collar 29 to facilitate relative rotation between collar 29 and shaft 31. Sleeve bearing 42 has a lower, outwardly extended lip 43 disposed between the lower edge of collar 29 and the adjacent surface of cross bar 32. The upper end of steering shaft 31 extends outwardly of collar 29. A cylindrical end cap 44 is assembled to the upper end of shaft 31 and has sidewalls that straddle the upper end of collar 29. Shaft 31 has a reduced, threaded upper end portion 46 extending through an opening in the end of cap 44. A nut 47 is threaded on the end 46 bearing against the end of cap 44 to secure the cap 44 to the shaft 31.

Bias means are provided to bias front wheel 36 in a centered or straight ahead orientation. A helical spring 48 has one end 49 fixed to the steering shaft 31 near the upper end thereof as by having the end 49 inserted through a small opening 50 in the sidewall of shaft 31 near the upper edge. Helical spring 38 coils around the shaft 31 and extends downwardly. The opposite end 51 of helical spring 48 is fixed to the collar 29. The end 51 is securely fastened in an opening in the upper edge of the collar 29. Spring 48 is neutral when the front wheel 36 is centered in a straight ahead orientation. Relative rotation between the steering shaft 31 and the collar 29 to turn the front wheel 36 in one direction or another results in a force exerted by the spring 48 to tend to return the front wheel to the straight ahead orientation.

Means are provided to limit the permissible amount of rotational movement of the front wheel 36 in steering of vehicle 10. A circumferential horizontal recess 53 is formed in shaft 31 near the top edge thereof at a location of overlap with cap 44, encompassing an arc corresponding to the permissible steering arc of front wheel 36. A bolt assembly has a wing nut-type head 54 fixed to a threaded shank 55. A threaded nut 56 is fixed to the outside of cap 44. Nut 56 is centered with respect to recess 53 over an opening through cap 44 when wheel 36 is in a centered position. The shank 55 is threaded through the nut 56 and through the corresponding opening in cap 44 into the area of recess 53. When cap 44 and shaft 31 rotate relative to the collar 29, the end of shank 55 moves in recess 53. The circumferential edges 59, 60 of the recess 53 limit further movement of the end of shank 55 and thus limit the permissible relative rotation of cap 44 and shaft 31 with respect to the collar 29. A central opening 58 extends from the bottom of recess 53 through the remainder of collar 29. Shank 55 can be threaded into the central opening 58 whereby cap 44 and shaft 31 are locked relative to collar 29 thereby locking the front wheel 36 in the centered position when it is so desired to do so. Shank 55 can be threaded outwardly of recess 53 by rotation of wing nut 54 to a position out of the recess 53 whereby rotation of the front wheel 36 is unlimited.

In operation of the vehicle 10, the operator places one foot on the platform 12 and uses the other foot to propel the vehicle. In straight ahead movement, the spring 48 biases the front wheel 36 in a centered position. Shank 55 is threaded to a position normally within the recess 53. Upon execution of a right turn, as illustrated in FIG. 6, the operator leans slightly to the right. This causes turning motion of vehicle 10 in addition to rotation of front wheel 36 in the direction of the turn. The amount of rotation of the front wheel 36 in a direction of the turn is limited when the end of shank 55 reaches an edge of recess 53. Upon recovery from the return, the operator stands in an upright orientation and, as the vehicle recovers from the turn, the helical spring 48 returns the front wheel 36 to the centered orientation. In the execution of a left turn, as illustrated in FIG. 7, the operator leans to the left and, as the turn is entered, the front wheel 36 rotates to the direction of the turn. The amount of rotation of the front wheel 36 in the direction of the turn is again limited by movement of the end of shank 55 and recess 53. Upon recovery from the turn, the helical spring 48 again biases the front wheel 36 to the centered position.

While there has been shown and described a preferred embodiment of a foot operated vehicle according to the invention, it will be apparent that certain deviations can be had from the embodiment shown without departing from the scope and spirit of the invention. For example, a shoe could be affixed to platform 12 to facilitate balancing thereon or, in like fashion, shoe straps could be provided.

The embodiments of the invention in which an exclusive property or privilege is claimed are defined as follows:

1. A foot operated vehicle comprising:
a frame having a generally flat foot support platform and a tubular collar secured to the forward end of the frame positioned in a generally upright orientation;
rear wheel means supporting the rear of the platform;
a steerable front wheel assembly connected to a forward portion of the frame in supportive relationship to the forward portion of the platform, said front wheel assembly including a steering shaft, a front wheel rotatably mounted to the steering shaft, said steering shaft extending through said tubular collar for pivotally connecting the front wheel to the frame for pivotal movement about a generally upright axis, said steering shaft having an upper end portion extended outwardly of the collar;
bias means connected between the frame and the tube collar comprised as a helical spring disposed in surrounding relationship to the upper end portion of the steering shaft extended outwardly of the collar and having one end connected to the collar and an opposite end connected proximate the upper end of the steering shaft, said spring operable to bias the front wheel in a straight ahead position with respect to the frame whereby upon execution of a turn the forward wheel pivots in the direction of the turn against the influence of the bias means, and is returned to a straight ahead position by the bias means upon completion of the turn, and;
a cap assembled to the top end of the steering shaft for rotation therewith and having downwardly extended cylindrical sidewalls positioned in covering relationship to the spring and in overlapping relationship to the upper end of the tubular collar.

2. The foot operated vehicle of claim 1 including:
means to limit the permissible amount of pivotal movement of the front wheel about said upright axis.

3. The foot operated vehicle of claim 2 wherein:
said rear wheel means includes a rear wheel, a rear axle connected to the frame, said rear wheel being rotatably mounted on the rear axle for rotation about a rear axis, a front axle, said front wheel being mounted on the front axle for rotation about a front axis, said front axle being connected to the connecting means pivotally connecting the front wheel to the frame, said foot support platform having a planar foot support surface positioned vertically beneath the forward and rear wheel axes.

4. The foot operated vehicle of claim 2 wherein:
the means to limit pivotal movement of the front wheel about the upright axis includes an arcuate circumferential recess located on the outside surface of the tubular collar toward the upper end thereof corresponding to an amount of permissive pivotal movement of said front wheel about said upright axis;
an elongate locking member fastened to said cap and having a shank extending through the cap into the area of the arcuate recess of the tubular collar to limit the amount of pivotal movement permitted of said front wheel by limiting the amount of pivotal movement of said cap with respect to the tubular collar.

5. The foot operated vehicle of claim 4 wherein:
said rear wheel means includes a rear wheel mounted on a rear axle for rotation about a rear axis, means connecting the rear axle to the frame, said foot support platform having a planar foot support surface positioned vertically beneath the axis of rotation of the forward and rear wheels.

6. The foot operated vehicle of claim 5 including:
an arcuate, deflectable fender having one end fixed to the frame and an opposite end extended over the rear wheel, a brake pad fastened to a surface of the fender in facing relationship to the rear wheel whereby the fender can be deflected to bring the brake pad in contact with the rear wheel to inhibit rotation of the rear wheel.

7. A foot operated vehicle of the type having a flat foot support platform for support of one foot of an operator while the vehicle is propelled by the other foot of the operator and of a type that is turned by a leaning motion of the operator in the intended direction of the turn, comprising:
- a frame having a flat foot support platform;
- a rear axle connected to a rear portion of the frame;
- a rear wheel mounted on the rear axle for rotation about a rear wheel axis;
- a neck extended upwardly and forwardly from a front portion of the platform;
- a tubular collar secured to the outer end of the neck and positioned in a generally upright orientation;
- a steerable front wheel assembly including a front axle, a front wheel mounted on the front axle for rotation about a front wheel axis, a steering shaft connected to the front axle, said steering shaft having a portion assembled in and extended outwardly of the tubular collar for pivotal rotation of the front wheel about a generally upright axis;
- bias means connected between the upper portion of the collar and the steering shaft portion extended outwardly of the collar operable to bias the front wheel in a straight ahead position with respect to the frame whereby upon execution of a turn, the front wheel pivots in the direction of the turn against the influence of the bias means, and is returned to the straight ahead position by the bias means upon completion of the turn; and
- a cap assembled to the top end of the steering shaft for rotation therewith and having downwardly extended cylindrical sidewalls positioned in covering relationship to the bias means and in overlapping relationship to the upper end of the tubular collar.

8. The foot operated vehicle of claim 7 wherein:
said bias means is comprised of a helical spring coiled about the steering shaft and having one end connected to the steering shaft and an opposite end connected to the tubular collar.

9. The foot operated vehicle of claim 7 or 8 wherein:
said foot support platform has a planar foot support surface positioned vertically beneath the front wheel axis and the rear wheel axis.

10. The foot operated vehicle of claim 7 or 8 including:
an arcuate, deflectable fender having one end fixed to the frame and an opposite end extended over the rear wheel, a brake pad fastened to a surface of the fender in facing relationship to the rear wheel whereby the fender can be deflected to bring the brake pad in contact with the rear wheel to inhibit rotation of the rear wheel.

11. The foot operated vehicle of claim 8 including:
a tubular sleeve bearing disposed between the collar and the steering shaft.

12. The foot operated vehicle of claim 7 or 8 including:
means to limit the permissable amount of pivotal movement of the front wheel about said upright axis.

13. The foot operated vehicle of claim 7 or 8 including:
an arcuate circumferential recess located on the outside surface of the tubular collar toward the upper end thereof corresponding to an amount of permissive pivotal movement of said front wheel about said generally upright axis;
an elongate locking member fastened to said cap and having a shank extending through the cap into the area of the arcuate recess of the tubular collar to limit the amount of pivotal movement permitted of said front wheel by limiting the amount of pivotal movement of said cap with respect to the tubular collar.

14. The foot operated vehicle of claim 13 wherein:
said shank is adjustably threaded into the cap.

* * * * *